Sept. 4, 1928.  1,683,314
R. L. STINCHFIELD
POWER DRIVEN CAMERA WITH MOTOR SIGNAL
Filed April 30, 1925   2 Sheets-Sheet 1
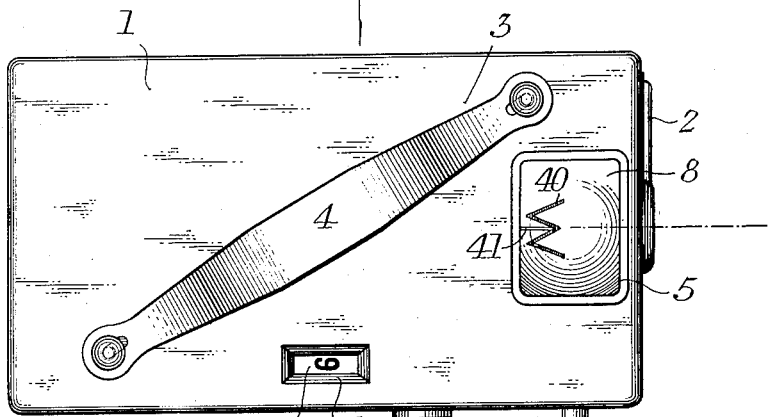
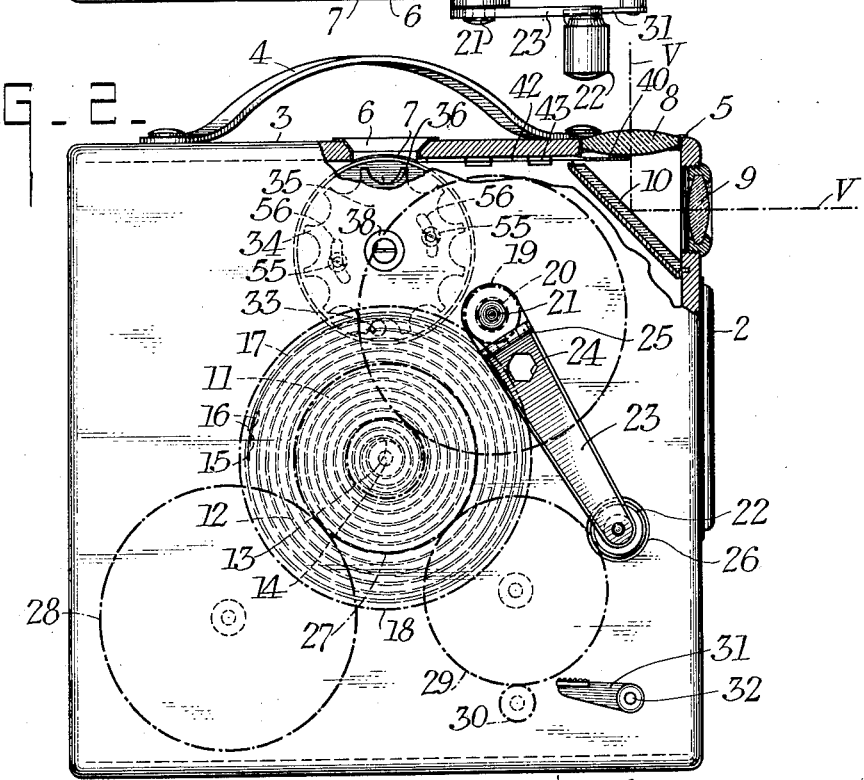
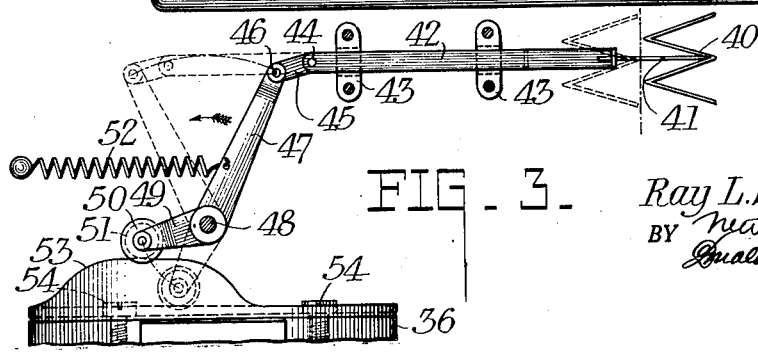
INVENTOR.
Ray L. Stinchfield,
BY
ATTORNEYS.

Sept. 4, 1928.
R. L. STINCHFIELD
1,683,314
POWER DRIVEN CAMERA WITH MOTOR SIGNAL
Filed April 30, 1925  2 Sheets-Sheet 2
FIG_4_
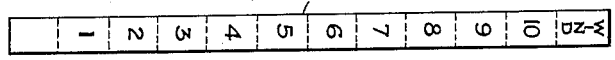
FIG_5_
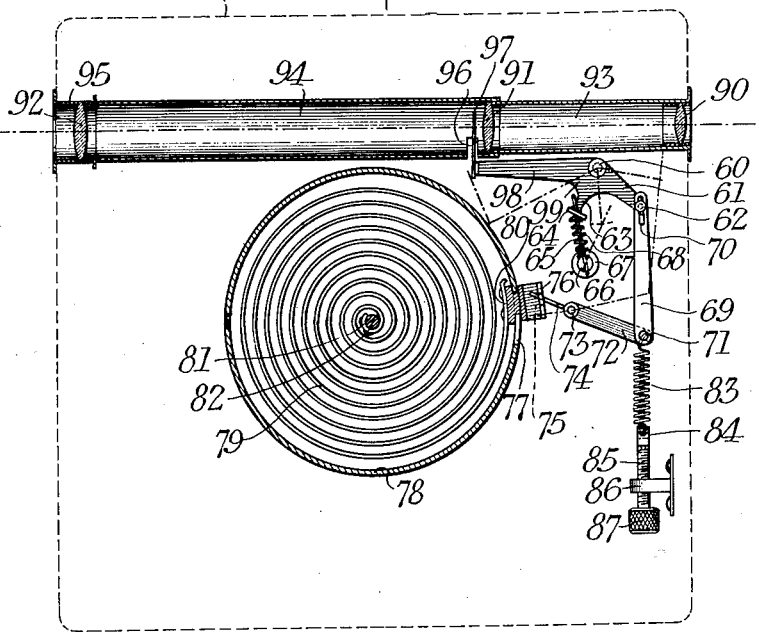
FIG_6_
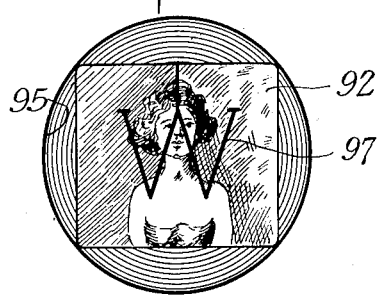
FIG_7_
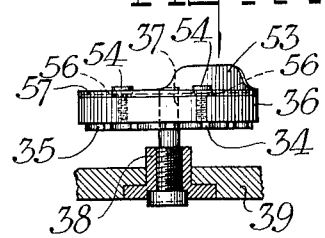
INVENTOR.
Ray L. Stinchfield
BY
ATTORNEYS.

Patented Sept. 4, 1928.

1,683,314

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

POWER-DRIVEN CAMERA WITH MOTOR SIGNAL.

Application filed April 30, 1925. Serial No. 27,018.

This invention relates to photography, and more particularly to photographic cameras of the motor driven motion picture type. One object of my invention is to provide a signal adapted to indicate that the energy in the motor is about to become exhausted. Another object is to provide a signal visible in the finder for indicating that the motor should be re-energized, the signal functioning in time to permit an operator to finish a predetermined length of exposures. Another object is to provide a signal which is visible in the finder and yet which will not obscure the view being photographed. Another object is to provide a signal which may be adjusted to operate after the desired portion of the motor's energy is expended, and other objects will appear hereinafter from the following specification, the novel features being pointed out in the claims at the end thereof.

Coming now to the drawings, wherein like reference characters denote like parts throughout:

Fig. 1 is a plan view of a typical motion picture camera provided with a signal illustrated and constructed in accordance with one embodiment of my invention;

Fig. 2 is a part side elevation and part section of the camera shown in Fig. 1;

Fig. 3 is a plan view of a portion of the signaling mechanism removed from the camera;

Fig. 4 is a diagrammatic showing of a dial used in connection with the motor spring;

Fig. 5 is a sectional view through the signaling apparatus used in another embodiment of my invention;

Fig. 6 indicates the view which will appear in the finder after the signal has been operated, and Fig. 7 is a plan view of the dial and signal member.

In Fig. 1, I have shown a motion picture camera which consists of a main casing 1 to which there is hinged a cover 2 for protecting the camera objective not shown. The upper wall 3 of the camera is provided with a carrying handle 4, with a finder 5, and with a window 6 through which a dial 7 is visible. In this embodiment of my invention, the finder is of the right angle vision type, in which there is an upper viewing lens 8 and a finder lens 9. A mirror 10 reflects the image along the line shown in dot and dashed lines at V.

This motion picture camera may be of the type shown in application for Letters Patent filed, Aug. 22, 1924, Serial No. 733,653 by Edwin C. Fritts. The motion picture pull-down mechanism may be operated by means of a motor, in this case a spring motor 11. One end of the spring 12 is attached to a central hub 13 fixedly attached to the shaft 14. The other end of the spring 15 is preferably attached at 16 to the wall 17 of the casing which encloses a spring. This spring may be energized through gear 18, and pinion 19 carried by shaft 20 which terminates in a nut 21. The handle 22 is carried on a lever 23 which is apertured at 24 to receive the nut 20 when the handle is swung about its hinge 25. When not in use, the handle 22 may lie in an aperture 26 in the camera wall. Gears 27 and 28 operate the take-up mechanism, and gears 27, 29 and 30 are for operating the pulldown mechanism. The motor is controlled by a releasing lever 31 carried by a shaft 32. Since these members do not form a part of my invention, they will not be further described.

When the motor above described has been energized, the operator may make a series of motion pictures by depressing the lever 31. In order to indicate how much of the energy stored up in the spring has been expended, the following mechanism is provided: gear 18 carries a pin 33 arranged to strike a tooth 34 of the star wheel 35 at each revolution of the gear. When the gear is turned through the handle 26 for winding the spring, the star wheel will turn in one direction, and when the lever 31 is depressed, permitting the motor to drive the camera, the star wheel turns in the opposite direction. In each case it is moved one step at a time or a distance equal to that between the teeth 34 each time the gear 18 makes one revolution. The star wheel 35 is attached to a wheel 36 which is carried upon a shaft 37 having a bearing 38 in the camera wall 39, as shown in Fig. 7. This disc is provided with a dial 7 diagrammatically illustrated in Fig. 4 as being graduated from one to ten.

The star wheel 35, in this instance, is provided with 12 teeth but its total movement is only a distance equivalent to 11 teeth so that there are actually 11 divisions on the scale, the last one being marked "wind", indicating that the motor energy has been fully expended. The operator may, by glancing through the window 6 at any time, see what proportion of the spring energy has been used. For instance in Fig. 4, the numeral 9 indicates approximately nine-tenths of its useful energy has been used.

It is desirable to notify the operator some time before the energy of the motor has been used up, because it frequently happens that the operator may be looking in the finder at the view which he is taking and will not notice the indicating marks of scale 7. Moreover, if the spring is permitted to become fully unwound, the camera may stop in the middle of a desirable scene. My invention is particularly directed to provide a signal which appears in the finder so that the difficulties above described may be overcome.

As shown in Fig. 3, I provide a signal 40 consisting, in this instance, of a skeleton W mounted on a rod 41 fixedly attached to the slide 42. This slide moves in the supporting yokes 43, and is pivotally attached at 44 to a link 45 which is pivoted at 46 to the long arm of a bell crank lever 47. Lever 47 is pivoted at 48 to a camera wall, and the short arm 49 carries a roller 50 grooved at 51. A spring 52 normally moves the bell crank lever in the direction shown by the arrow, in which roller 50 will bear against the cam 53.

Cam 53 is preferably attached to the disc 36 by means of screws 54 which pass through arcuate slots 55 in the base 56, supporting the flange 57, the upper edge of which constitutes the cam 53. By means of the screws and slots the angular relation of the cam to the disc may be altered so that the signal may be made to operate when the motor has moved to a predetermined degree. I find it useful to cause the signal to move after eight-tenths of the spring's energy has been expanded as indicated in Fig. 4, although this, of course, is largely a matter of personal preference.

The operation of the above described embodiment of my invention is as follows: with the parts in the position shown in Fig. 1 for instance, the operator may energize the motor by turning handle 26 and with it gears 19 and 18. At each revolution of gear 18, pin 33 will strike a tooth 34 of the star wheel, and thus move it until the numeral 1 on the scale 7 indicates that the motor is fully wound. After taking a series of scenes or pictures, the star wheel 35 will be moved in a reversed direction so that the gradually increasing numbers on the scale indicate the energy remaining in the motor. The operator may, for instance when the dial reads 7, take a relatively long scene, and while viewing the scene in the finder 8, the signal W may be thrust into its operative position, thus calling attention to the fact that the motor will soon require winding. He may complete the picture with the signal in place, because, as indicated in Fig. 6, the scene is still fully visible.

In Fig. 5 I have shown another embodiment of my invention, in which the signal is applied to a finder of the type shown in the application of Julien Tessier for photographic camera, Serial No. 617,833, filed February 8, 1923. In this form the finder is of the direct vision type, in which a lens 90 casts an image upon the lens 91, this image being magnified and reversed by a lens 92 so that the image will appear right side up. These lenses are mounted in suitable tubes 93, 94 and 95. Tube 94 is slotted at 96 to receive the signal 97 which is carried upon an arm 98 of a lever 99 pivoted at 60 to a support, and having an arm 61 carrying a pin 62 extending to one side of the pivotal point. A third arm 63 is provided with a flange 64 which is apertured to receive the pin 65. This pin is carried by a post 66 which is free to turn in a bearing 67. A spring 68 encircles pin 65, and by pressing on the post and the flange 64; it tends to hold lever 99 in an operative or in an inoperative position.

A link 69 is slotted at 70 to receive the pin 62, and is pivotally attached at 71 to an arm 72 which may turn upon a stud 73. A pin 74 is mounted upon arm 72, and passes through slot 75 in the slide 76, which may move through the slot 77 in the casing 78 which surrounds the spring 79. End 80 of the spring is attached to slide 76 and the inner end 81 is attached to the main driving shaft 82. A spring 83 connects the pivot 71 to a swivel 84 which is attached to a set screw 85, which may be turned in the tapped lug 86 by means of the head 87.

When the spring has been completely wound, the slide 76 is drawn to the lower end of the slot 77, and lever 72 is moved to the position shown in dot and dashed lines, in which spring 83 will be placed under tension. When link 69 moves upwardly, pin 62 will engage the lower end of the slot, and arm 61 will be thrust upwardly causing the lever 99 to snap into the position diagrammatically shown by the dot and dashed lines. This is the inoperative position, in which the signal 97 is moved out of tube 94. The tension on spring 83 is adjusted so that when the energy of spring 79 is nearly expended, the spring 83 will draw down on lever 72 thus rocking this lever about pivot 73 and moving the slide 76 to the position shown in full lines. This movement will rock lever 99 through link 69 and cause it to snap into its operative position, in which the signal 97 will appear in the finder.

While I have described preferred embodiments of my invention, it is obvious that a number of modifications in the structure may be made. I contemplate as within the scope of my invention all such modifications as may come within the terms of the appended claims.

Having thus described my invention, what I claim as new and desire to secure by Letters Patent is:

1. In a motion picture camera having a finder, a spring motor of the type in which energy may be stored for operating the camera, and a signal movably mounted relative to the finder operatively connected to and controlled by the motor adapted to give an indication in the finder relative to the energy stored in the motor.

2. In a motion picture camera having a finder, a spring motor for operating the camera, a signal movably mounted relative to the finder adapted to indicate in the finder a condition of the motor connections between the signal and the motor, said signal including a member adapted to appear in and to occupy a small area of the field of the finder.

3. In a motion picture camera having a finder, a motor of the type in which energy may be stored for operating the camera, and a signal movably mounted relative to the finder and operatively connected to the motor and adapted to give an indication in the finder relative to the energy stored in the motor, said signal being adapted to slide across the field of view in the finder, occupying only a small portion of the field thereof.

4. In a motion picture camera, the combination with a motor in which energy may be stored, of a finder and a signal movable relative thereto, connections between the signal and motor through which the motor may move the signal for indicating in the finder when a predetermined portion of the energy stored by the motor has been expended.

5. In a motion picture camera, the combination with a motor drive therefor, of means for storing energy in the motor, a finder for the camera, and a signalling device movably mounted with respect to the finder and connected to the motor, through which the signal may be controlled by the motor for operating the signalling device whereby the signal may indicate in the finder that the motor should be re-energized.

6. In a motion picture camera the combination with a motor in which energy may be stored, a finder, and a signal adapted to be operated by the motor so as to be visible simultaneously with the view in the finder, means for storing energy in the motor and connections whereby the motor may drive the camera, the signal being movable from its visible position when the energy storing means is actuated, and being movable to its visible position when the motor is operating the camera.

7. In a motion picture camera, the combination with a motor adapted to drive the motion picture camera, and having a shaft adapted to rotate in one direction when the camera is being driven, and said motor shaft being adapted to be turned in the opposite direction for storing up energy in the motor, a finder, and a signal associated therewith adapted to be simultaneously viewed with the view in the finder, connections between the motor and the signal whereby a portion of the movement of the motor shaft in one direction will move the signal to an operative position in which it may be viewed with the view in the finder, and whereby a portion of the movement of the motor shaft in a reverse direction may move the signal into an inoperative position in which it can not be viewed with the image in the finder.

8. In a motion picture camera, the combination with a motor adapted to drive the camera, and having a shaft adapted to turn in one direction when the camera is so driven, and adapted to be turned in the opposite direction for storing energy in the motor, a member associated with the motor shaft adapted to move in one direction when the motor operates under its own power and in the opposite direction when energy is being stored in the motor, a finder, and a signal associated therewith, connections between the signal and the movable member whereby the signal will be moved to and from a signalling position in the finder by the movable member.

9. In a motion picture camera, the combination with a motor adapted to have energy stored therein, of a signal adapted to indicate the proportion of the total energy used at all times, a second signal connected to the first signal and adapted to show only when the first signal has reached a predetermined position, and connections between a signal and the motor whereby the signals are controlled by the motor.

10. In a motion picture camera, the combination with a motor adapted to have energy stored therein, of a signal including a dial to indicate the condition of the motor, means including the motor for controlling the dial, and a second signalling device interconnected with the dial operating mechanism to signal when the dial has reached a predetermined position.

11. In a motion picture camera, the combination with a motor adapted to have energy stored therein, of means visible from the exterior of the camera for indicating the energy stored in the motor, said means including two members, one indicating the energy stored in the motor at all times, and the other signalling when the first dial has been moved to a predetermined position, means controlled by the motor for actuating the signals.

12. In a motion picture camera, the combination with a motor, adapted to have energy stored therein, of a finder carried by the camera, means for determining the energy stored in the motor controlled by the motor, said means having two interconnected indicating members, one member being visible at all times from the camera exterior and indicating the energy in the motor, and the other member being visible in the camera finder when the first member has been moved to a predetermined indicating position.

13. In a motion picture camera, the combination with a motor in which energy may be stored, a finder having a viewing opening of relatively large area, a signal adapted to move in the viewing opening of the finder and being of such a size that it will obstruct only a very small part of the relatively large area of the finder, operative connections between the motor and the signal, said signal being adapted to be moved through the connections by the motor to and from a signalling position in the finder in which it may indicate that the motor should be reenergized.

Signed at Rochester, New York, this 28th day of April, 1925.

RAY L. STINCHFIELD.